United States Patent
Soltesz (10) Patent No.: US 9,723,794 B2
(45) Date of Patent: Aug. 8, 2017

(54) POWER TOOL HAVING AN INTERCHANGEABLE BLADE ASSEMBLY AND METHOD FOR INTERCHANGING THE BLADE ASSEMBLY

(75) Inventor: Robert Soltesz, Miskolc (HU)

(73) Assignee: Robert Bosch GmbH, Stuttgart (DE)

( * ) Notice: Subject to any disclaimer, the term of this patent is extended or adjusted under 35 U.S.C. 154(b) by 1157 days.

(21) Appl. No.: 13/390,644

(22) PCT Filed: Jul. 16, 2010

(86) PCT No.: PCT/EP2010/060283
§ 371 (c)(1),
(2), (4) Date: Apr. 30, 2012

(87) PCT Pub. No.: WO2011/020662
PCT Pub. Date: Feb. 24, 2011

(65) Prior Publication Data
US 2012/0204699 A1 Aug. 16, 2012

(30) Foreign Application Priority Data
Aug. 18, 2009 (EP) .................................... 09168081

(51) Int. Cl.
*A01G 3/053* (2006.01)
*B26B 15/00* (2006.01)

(52) U.S. Cl.
CPC .............. *A01G 3/053* (2013.01); *B26B 15/00* (2013.01); *Y10T 29/49826* (2015.01); *Y10T 83/9454* (2015.04)

(58) Field of Classification Search
CPC .......... B26B 15/00; A01G 3/053; A01G 3/04; A01G 2003/0461; Y10T 83/9454
(Continued)

(56) References Cited

U.S. PATENT DOCUMENTS 4,294,013 A * 10/1981 Krieg ..................... B23D 51/10
30/392
5,263,972 A * 11/1993 Evans ..................... B23D 51/10
30/339
(Continued)

FOREIGN PATENT DOCUMENTS

CN 201107932 Y 9/2008
CN 101371642 A 2/2009
(Continued)

OTHER PUBLICATIONS

International Search Report corresponding to PCT Application No. PCT/EP2010/060283, mailed Oct. 8, 2010 (German and English language document) (6 pages).

*Primary Examiner* — Stephen Choi
*Assistant Examiner* — Evan MacFarlane
(74) *Attorney, Agent, or Firm* — Maginot, Moore & Beck LLP (57) ABSTRACT

A power tool includes a housing, a blade assembly, a drive assembly within the housing for driving the blade assembly, and a cover that is coupled to the power tool and is movable between at least two positions. The blade assembly is fixedly retained by the power tool when the cover is in a first position and is detachable from the power tool when the cover is in a second position. The cover has tool-less means for coupling the blade assembly to the cover when the cover is in a second position.

17 Claims, 8 Drawing Sheets

(58) Field of Classification Search
USPC ........... 30/215–220, 208–210, 223; 606/177, 606/178
See application file for complete search history.

(56) References Cited

U.S. PATENT DOCUMENTS

| | | | | |
|---|---|---|---|---|
| 5,846,244 A * | 12/1998 | Cripe | ...................... | A61B 17/14 30/166.3 |
| 6,263,579 B1 | 7/2001 | Nagashima | | |
| 6,949,110 B2 * | 9/2005 | Ark | ...................... | A61B 17/142 173/217 |
| 7,497,860 B2 * | 3/2009 | Carusillo | ................ | A61B 17/14 30/166.3 |
| 2002/0198556 A1 * | 12/2002 | Ark | ........................ | A61B 17/14 606/178 |
| 2004/0204731 A1 * | 10/2004 | Gant | ...................... | A61B 17/14 606/170 |
| 2007/0050991 A1 * | 3/2007 | Mooney | ................... | B26B 19/24 30/210 |

FOREIGN PATENT DOCUMENTS

| | | | |
|---|---|---|---|
| DE | 28 39 780 A1 | 3/1980 | |
| DE | 38 16 363 A1 | 11/1989 | |
| DE | 20 2009 002 224 U1 | 7/2009 | |
| EP | 0 142 002 A2 | 5/1985 | |
| EP | 1 424 002 A1 * | 2/2004 | ............. A01G 3/053 |
| EP | 1 424 002 A1 | 6/2004 | |
| EP | 1 479 284 A1 | 11/2004 | |
| EP | 1 762 136 A2 | 3/2007 | |
| FR | 2 388 482 | 11/1978 | |
| JP | 2003-117267 A | 4/2003 | |
| JP | 2006-296238 A | 11/2006 | |
| JP | 2006-326780 A | 12/2006 | |
| JP | 2007-209304 A | 8/2007 | |
| JP | 2008-173047 A | 7/2008 | |

* cited by examiner

POWER TOOL HAVING AN INTERCHANGEABLE BLADE ASSEMBLY AND METHOD FOR INTERCHANGING THE BLADE ASSEMBLY

This application is a 35 U.S.C. §371 National Stage Application of PCT/EP2010/060283, filed on Jul. 16, 2010, which claims the benefit of priority to Serial No. EP 09168081.9, filed on Aug. 18, 2009 in Germany, the disclosures of which are incorporated herein by reference in their entirety.

BACKGROUND

The present disclosure relates to a power tool having interchangeable cutting or trimming elements and a method for quickly, cleanly and safely attaching or detaching these elements.

EP 1 762 136 B1 discloses a power tool for cutting and trimming vegetation wherein interchangeable blades are incorporated into a blade carrier assembly that includes a partial housing or casing for each set of blades. Since each set of blades is fastened to its own distinct housing element, there is unnecessary duplication of parts. Because of the integrated housing elements, the blade carrier assemblies would be expected to take up more space during storage. Since the blade carrier assemblies are configured to be completely detached from the tool, the user is neither protected from moving parts, nor from the grease that is customarily provided on the tool inner components when the assemblies are interchanged. EP 1 479 284 B1 discloses motor-operated grass shears wherein the blade arrangement is retained via a retaining part consisting of a flap which can be pivoted about a hinge. This configuration has the same disadvantages as the '136 patent: a user that is exchanging the blades is not protected from grease or internal tool components.

SUMMARY

A power tool is described which has a tool housing, a blade assembly, a drive assembly located within the tool housing for driving the blade assembly, and a cover that is coupled to the power tool and is movable between at least two positions. The blade assembly is fixedly retained by the power tool when the cover is in a first (closed) position and is detachable from the power tool when the cover is in a second (open) position. The cover has tool-less means for coupling the blade assembly to the cover. This has the advantage that the user does not have to manually couple the blade assembly to the drive assembly. The user simply couples the blade assembly with the cover and closes the cover. The portions of the blade assembly that interface with the drive assembly are often covered with grease, but the user does not need to contact these portions of the blade assembly.

When the user couples the blade assembly with the cover, it is advantageous if the cover is further provided with tool-less means for detachably retaining the blade assembly, so that the blade assembly is retained and prevented from falling out of the tool when the cover is open and the tool is positioned tip down.

Since the cover is preferably manufactured from plastic, the tool-less means for detachably retaining the blade assembly to the cover can conveniently include a notch on one of the blades of the blade assembly and at least one flexible member extending from the cover for cooperating with the notch. Such a structure allows a simple "snap fit" of the blade assembly provided that there are guide members to otherwise properly position the blade assembly. While the snapping of a flexible member provides sufficient force to retain the blade assembly, it can be readily overcome by the user when he wishes to remove the blade assembly from the cover.

So that the cover continues to limit user exposure to the inner workings of the tool, it is preferable if the second (open) position of the cover is substantially parallel to the first position. This orientation of the cover is also preferable to one in which it pivots away from the tool, since this could create a dangerous condition should the blade assembly be coupled with or retained to the cover.

So that the fingers of the user are protected from internal moving parts when the user is removing or inserting the blade assembly, the maximum displacement distance between the first (closed) position and the second (open) position of the cover is less than or equal to 150% of the maximum thickness of the blade assembly (12). This distance is small enough so that the user will not be able to contact internal moving parts or contaminate himself with the grease that is provided on these internal parts. Furthermore the user will also be less likely to contaminate the inner workings of the tool by introducing foreign objects or particles into the inner portions of the tool.

The drive assembly includes a motor, at least one gear, and an element that is eccentrically-positioned with respect to the at least one gear for driving movement of the blade assembly. The eccentrically positioned element is biased in the direction of the blade assembly so that it becomes coupled with the blade assembly when the tool is energized. It is advantageous to provide a mechanism for automatically aligning the blade assembly with the drive assembly so that the user does not have to align the drive pin with the blade slot when changing blades.

In order to facilitate the interchanging of different blade assemblies, the cover is biased into the second (open) position so that there is a quick opening action when the user releases the cover from the housing by pressing the side triggers. So that the operation of moving the cover into the closed position is simplified, the latches provided on the trigger include an angled surface. Movement from the second position to the first position is sufficient to activate means for coupling the cover to the tool housing in so far as the latches will be automatically deflected without the need for the user to push the buttons on the trigger.

So that the user does not inadvertently open the blade cover while using or transporting the tool, it is preferable if at least one force be provided in a direction substantially perpendicular to a direction of movement from the first position to the second position in order to decouple the cover from the tool housing. Buttons may be provided laterally on the cover so that the user can apply this force and disengage the latching means for coupling the cover to the tool housing.

For maximum safety and protection of internal components, the cover is preferably fixed to the power tool. That is, it is securely fastened in a way where it is not readily removed from the tool without damaging internal or external tool housings. In the preferred embodiment, the drive assembly includes a gear housing and the cover is non-removably coupled to the gear housing, which is in a fixed position within the tool. By having the cover interact directly with the gear housing, there is more precision in aligning the blade assembly with the gear elements when the blade assembly is coupled with the cover and the cover is closed. Furthermore, since it is concealed within the tool housing, the attachment means can be based on a convenient engineering solution without taking into account cosmetic aspects. The cover could alternatively be attached to the external housing, although providing attachment means on the external tool housing might be expected to limit flexibility in designing the shape of the tool housing.

The tool has means for non-removably coupling the cover to the tool which include at least one cavity and at least one guide element that extends from the cover substantially perpendicularly to a bottom surface of the cover. The guide element is preferably pin-shaped and passes through the at least one cavity. So that the attachment of the cover is non-removable, the guide element preferably forms a non-reversible snap-fit with the cavity. At least one spring positioned on the at least one guide element biases the cover into the second position. The spring bias advantageously provides for quick and automatic opening action when the user opens the cover.

The guide element is preferably pin-shaped and substantially perpendicular to the bottom surface of the cover so that smooth linear movement as it passes through a cavity can guide the cover when the cover moves from the first position to the second position, so that it moves in a direction substantially perpendicular to the bottom face of the cover. Preferably four guide elements are provided.

The tool-less means for coupling the blade assembly to the cover include a variety of guide elements which can advantageously be formed within the cover. The blade assembly is restricted from movement in all but one direction, the direction of insertion into the space between the cover and the remainder of the tool. By having fixed guide elements, there is less of a chance that the blade assembly will become detached from the cover inadvertently. The guide elements retain the blade assembly in an exact position so that it can be properly aligned with the drive assembly when the cover is closed.

The design is simplified if the same structures which provide tool-less means for coupling the blade assembly to the cover also comprise means for coupling the cover to the power tool. By having more than one function for certain structures, there is less complexity in designing and manufacturing the cover.

A method is described for functionally coupling a blade assembly with a power tool, wherein the power tool has a tool housing, a drive assembly within the tool housing, and a cover that is non-removably coupled to the power tool. The method includes the steps of first moving the cover from a first position to a second position, then coupling a blade assembly to the cover, and then moving the cover from the second position to the first position so that the blade assembly is brought into contact with the drive assembly and is retained in the power tool. This method simplifies the changing of different blade assemblies since the intermediate step is positioning the blade assembly on the cover rather than on the drive assembly. Spring-bias facilitates the first step of opening the cover while the latches provided on the cover will automatically engage the tool housing when the user presses on the cover to overcome the spring bias.

DETAILED DESCRIPTION

Figure 1:
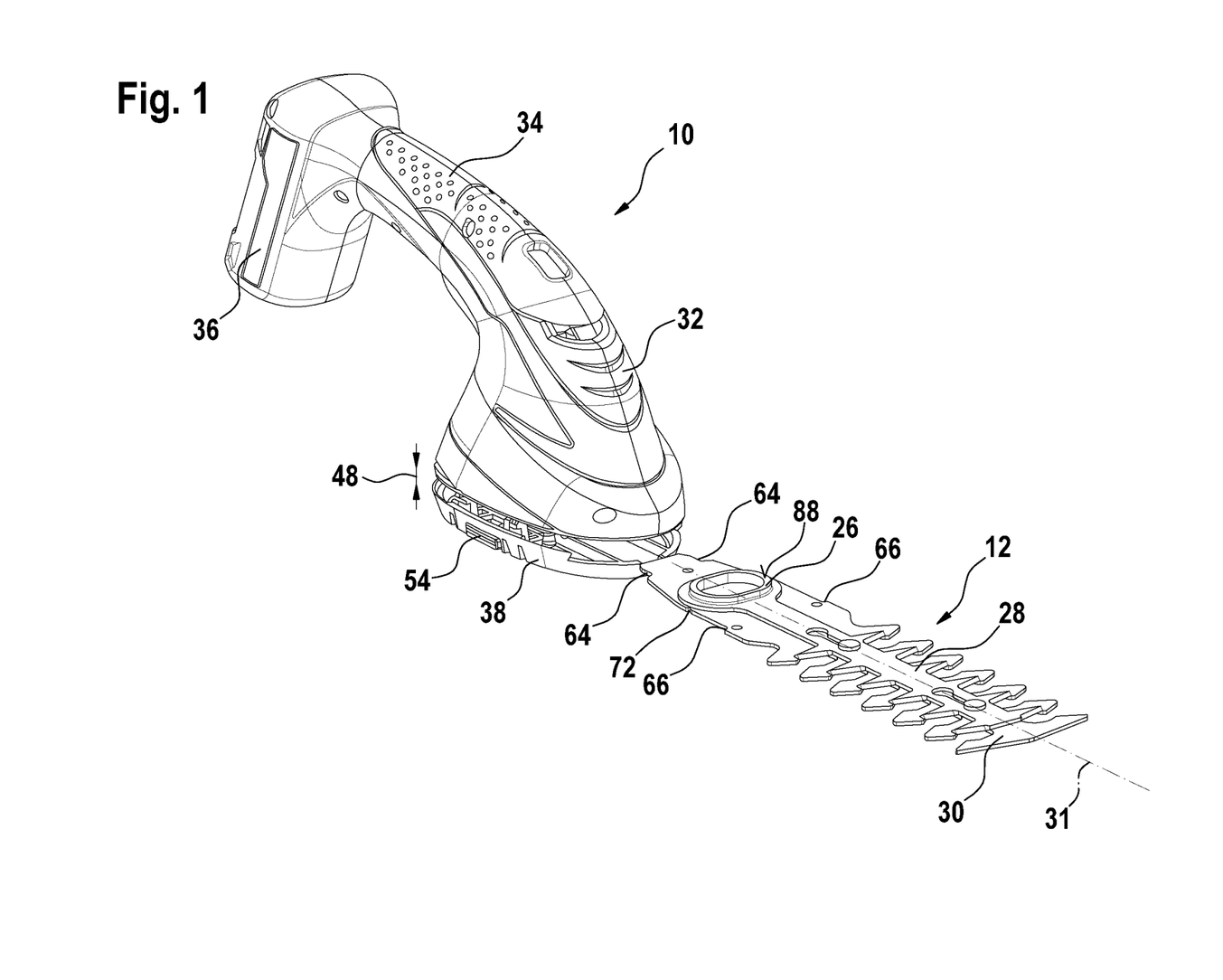
FIG. 1 is a perspective view of a tool with its cover in the open configuration and with the blade assembly removed.
Figure 3:
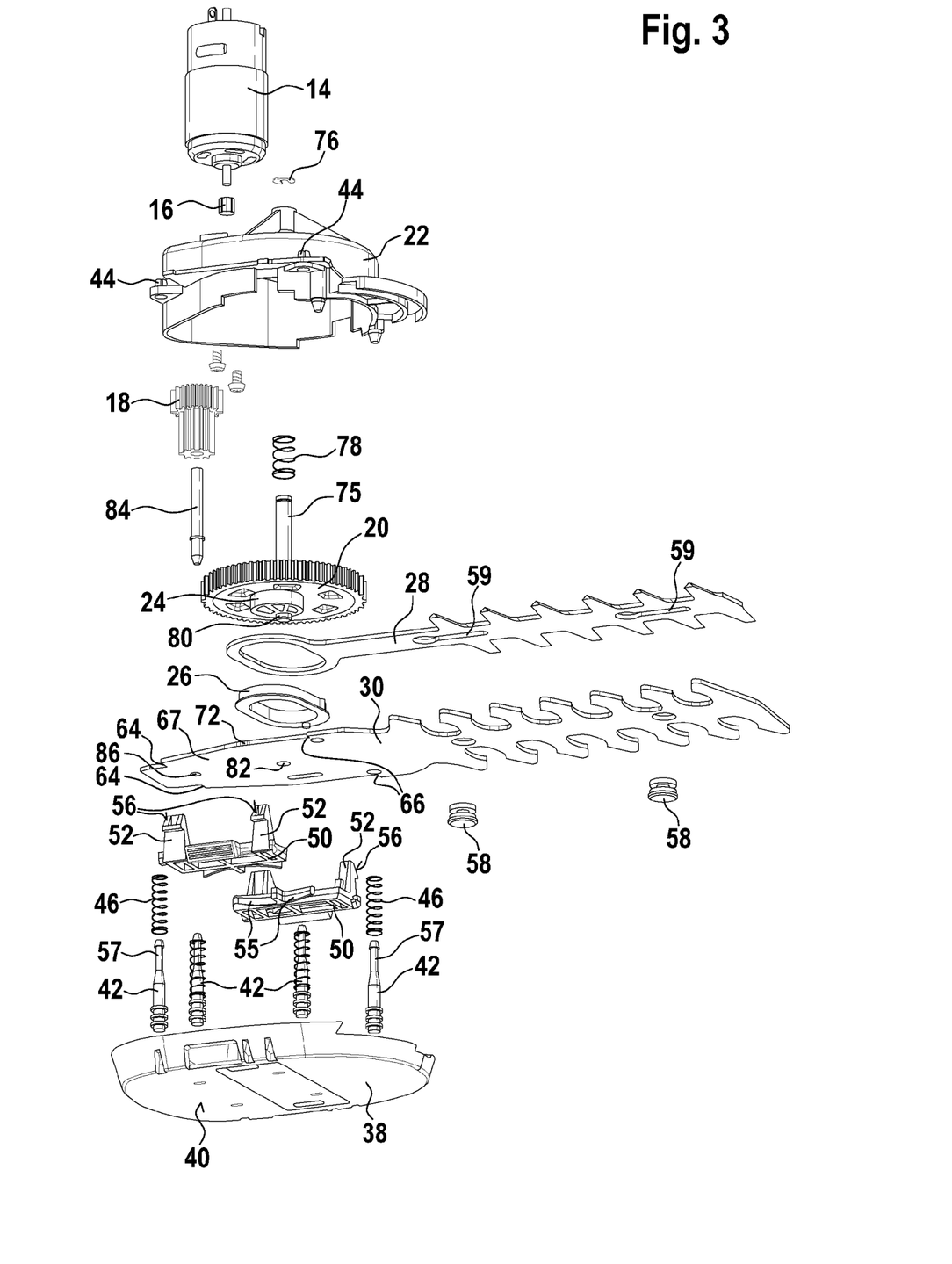
FIG. 3 is an exploded perspective view of the drive assembly, cover assembly and blade assembly shown in FIG. 2.

A cordless hand-held vegetation trimming tool 10 configured for driving an interchangeable blade assembly 12 is shown generally in FIG. 1. The exploded view in FIG. 3 illustrates internal components of tool 10, such as motor 14 for driving pinion gear 16. Intermediate gear 18 translates the output of motor 14 to rotate drive gear 20, each of these gears assembled within gear housing 22 and together with motor 14 comprising a drive assembly. The underside of drive gear 20 is provided with a disc-shaped eccentrically-positioned element 24 which when the tool is operating cooperates with oblong slot 26 provided on moving blade 28 for driving its movement relative to fixed blade 30.

The orientation of oblong slot 26 is such that eccentric element will drive moving blade 28 to move back and forth along blade assembly longitudinal axis 31. However, as is known in the art, the oblong slot of alternative blade assemblies may be oriented orthogonally to the oblong slot 26 that is illustrated. Using the same drive assembly, an alternative moving blade might, for example, be driven to pivot about a pivot axis relative to a fixed blade.

Tool housing 32 encloses the gears, gear housing 22 and motor 14 and is contiguous with tool handle 34. While power to drive motor 14 could alternatively be provided by an electrical cord for drawing AC power, it is preferably provided by an intrinsic rechargeable DC battery 36. The battery is preferably a lithium ion battery and it may alternatively be designed to be a removable battery pack for charging separately.

Figure 2:
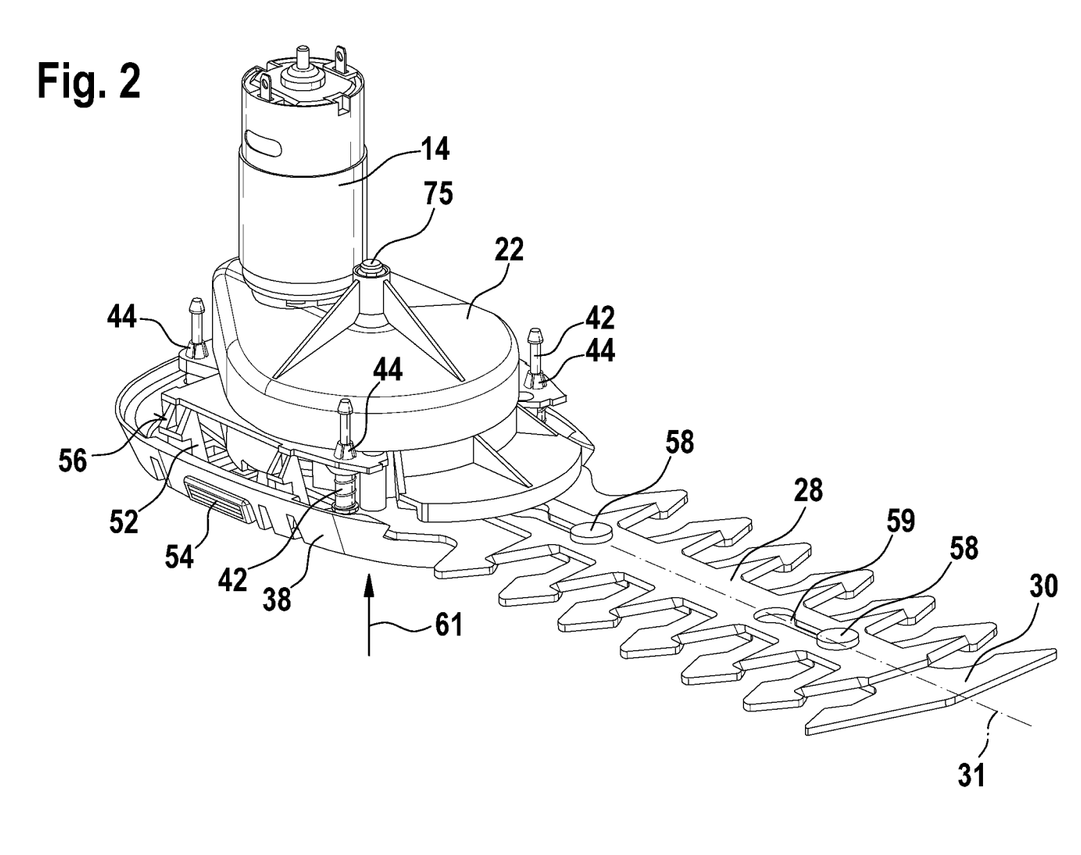
FIG. 2 is a perspective view of the tool drive assembly, cover assembly, and blade assembly.
Figure 9:
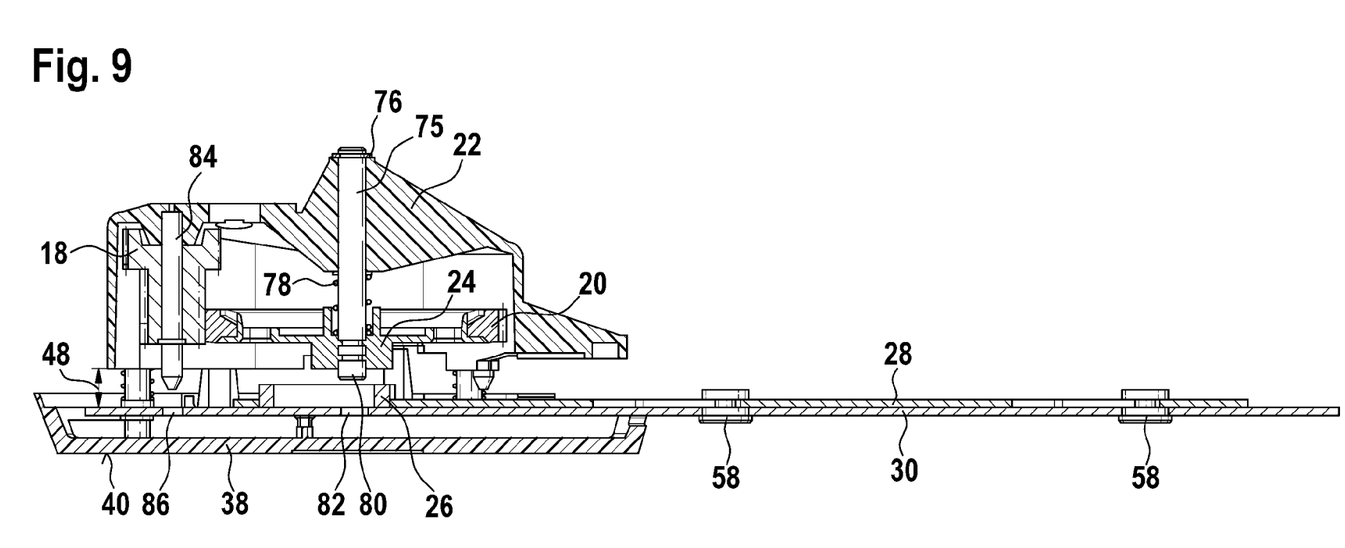
FIG. 9 is a cross-sectional view of the cover and gear assemblies wherein the cover assembly is in its open configuration and a blade assembly is coupled with the cover assembly.

The interior of tool 10 is substantially sealed off from the external environment by a cover 38 having a bottom surface 40 which is shown in its open configuration in FIGS. 1 and 9. This open position permits insertion or removal of a blade assembly 12 along a blade assembly longitudinal axis 31. Once tool 10 has been assembled during manufacture, cover 38 is essentially not removable from the tool. This is due to four pins 42 that extend from the inner side of cover 38 and pass through one-way snap-fit cavities 44 of gear housing 22 (see FIGS. 2 and 4). As cover 38 is preferably manufactured from plastic, pins 42 may be molded as intrinsic components of cover 38. However, so that they will be less likely to fracture along their length, they are preferably separate metal components that are permanently secured to cover 38 as part of a cover assembly. Alternatively similar snap-fit cavities for non-removably securing cover 38 could be provided on the inner surface of tool housing 32.

Compression springs 46 provided around pins 42 bias cover 38 into an open configuration wherein it is generally parallel to the bottom surface of housing 32, the extent of displacement depending on the length of pins 42. Preferably cover 38 has a displacement distance 48 that provides relatively little clearance for blade assembly 12 (compare the position of cover 38 in FIG. 7 or 8 versus FIG. 9). The portion of blade assembly 12 that is inserted into the tool has a maximum thickness 49 defined as the distance from the bottom surface of the fixed blade 30 to the top surface of oblong slot 26 (see FIG. 8). In the illustrated example, blade assembly 12 has a maximum thickness 49 of approximately 5.9 mm and displacement distance 48 is approximately 7 mm. Hence displacement distance 48 is approximately 115% of the maximum thickness 49 of blade assembly 12. It is preferable if this distance is greater than 105% and less than 150% of the maximum thickness 49 of the blade assembly 12.

So that cover 38 can be secured in a closed position, the cover assembly also includes laterally mounted triggers 50 each of which comprises two latches 52 and one push button 54 that passes through cover 38. Spring elements 55 encourage latches 52 to lock onto cooperating shoulders (not shown) within the inner side of tool housing 32. Each latch 52 is provided with an angled surface 56 so that a force provided to the underside of cover 38 will cause laterally mounted triggers 50 to move inwards against the bias of spring elements 55 so that latches 52 will automatically engage tool housing 32 without the need for the user to press buttons 54. To move cover 38 into the open position, the user presses respective push buttons 54 to separate latches 52 from housing 32. This allows the biasing action from springs 46 to move cover 38 into the open position. Preferably each trigger 50 can be operated independently. That is, the cover 38 may take on a third position intermediate to the open and closed configurations, wherein one set of latches 52 is secured to housing 32 and the other is not. Movement that is not substantially parallel to the force from springs 46 is structurally permitted by providing tapered portions 57 near the interface between pins 42 and snap-fit cavities 44.

Each blade assembly 12 comprises a fixed blade 30 which is closely coupled with moving blade 28 via permanent fasteners 58, such as bolts or rivets. Oblong slot 26 may be intrinsic to moving blade 28 or may preferably be formed of a separate part. Fasteners 58 may pass within slots 59 in moving blade 28 allowing a shearing action to be created when moving blade 28 is driven to move along longitudinal axis 31.

To insert a blade assembly 12, push buttons 54 are depressed so that cover 38 is biased into its open position as in FIG. 1. Next, blade assembly 12 is inserted via a general sliding motion along longitudinal axis 31 into the space generally between tool housing 32 and cover 38. As it is inserted, blade assembly may be guided by guide features provided on cover 38 and so that it becomes temporarily attached to cover 38. Next, force is applied in direction 61 to move cover 38 into its closed position. The process is similar for removing blade assembly 12. Push buttons 54 are depressed so that cover 38 is biased into its open position. Next, blade assembly 12 is withdrawn along longitudinal axis 31, thereby detaching blade assembly 12 from the guide features. Next, force is applied in direction 61 to move cover 38 into its closed position.

Figure 4:
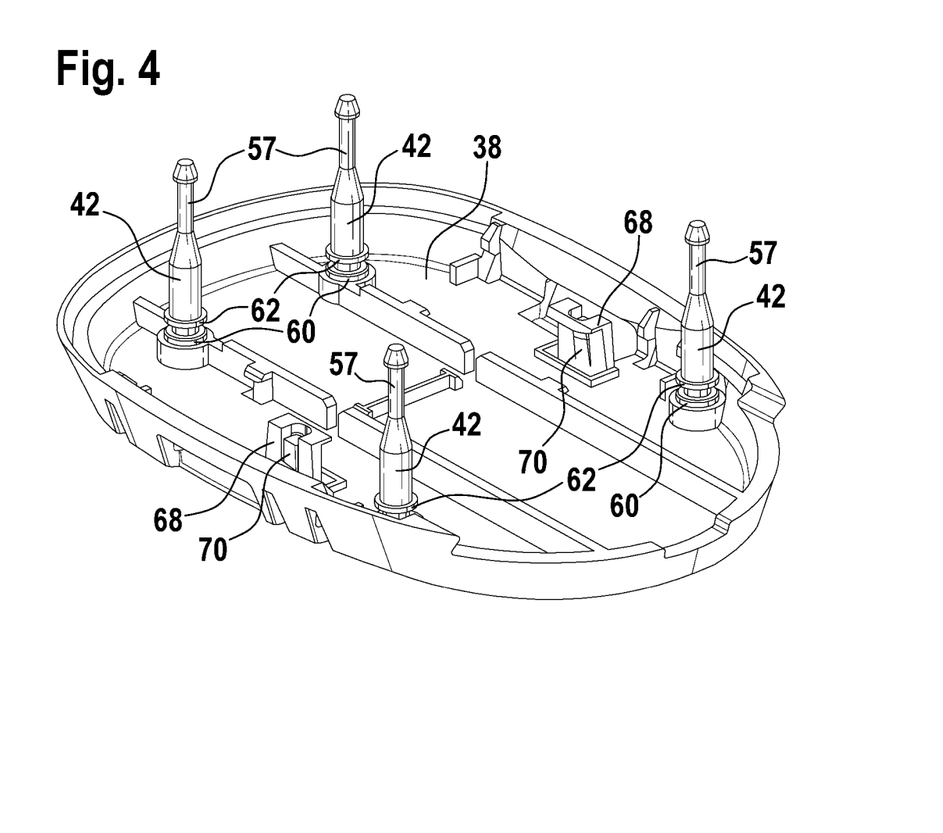
FIG. 4 is a perspective view of a portion of the cover assembly.
Figure 5:
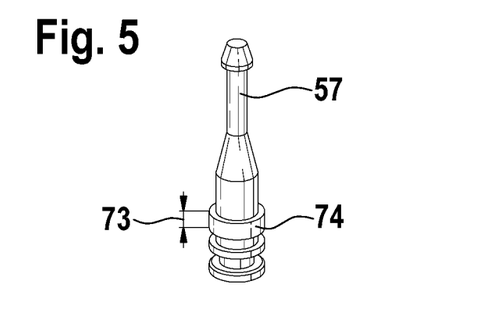
FIG. 5 is a side view of an alternative pin shape.
Figure 6:
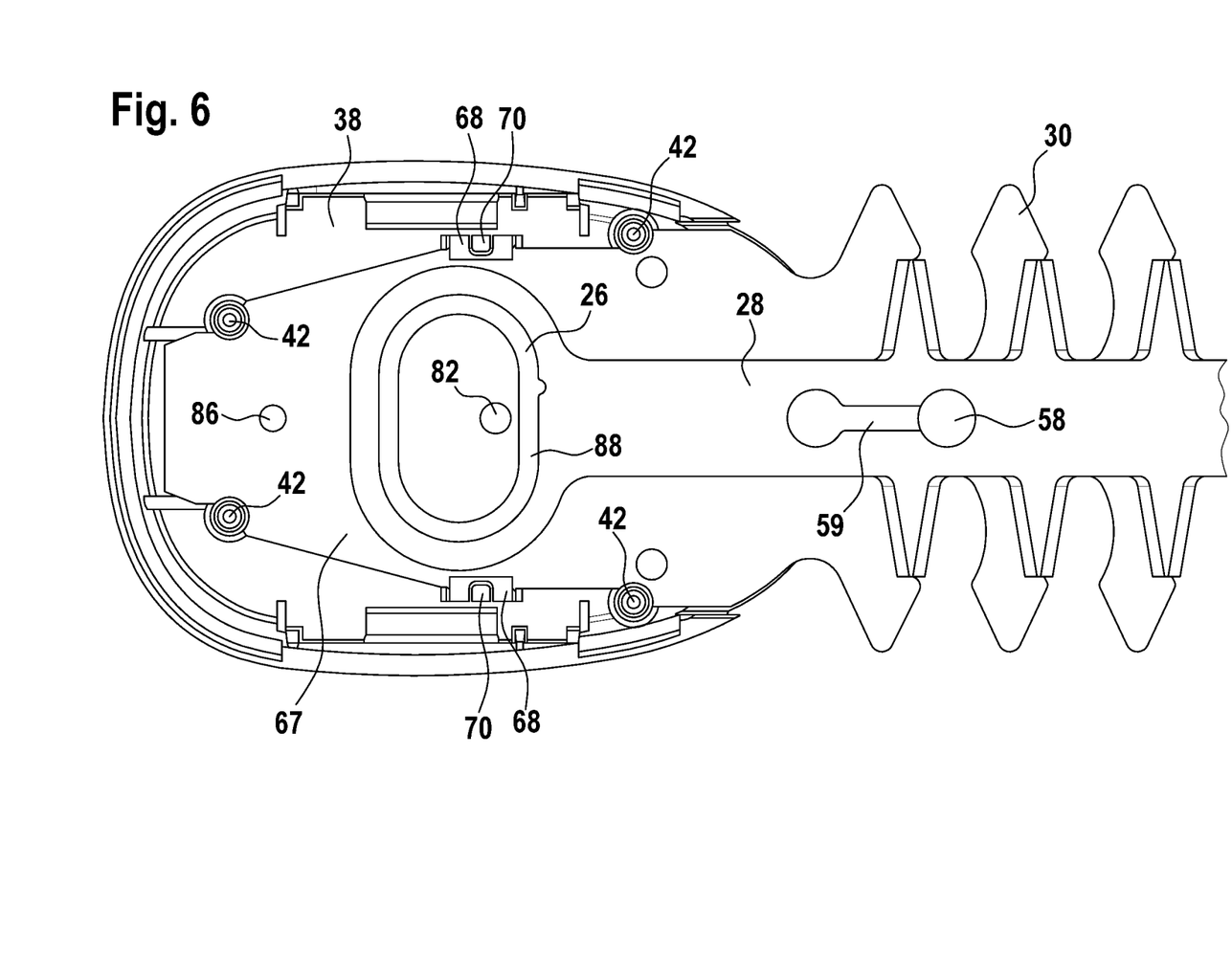
FIG. 6 is a top view of a portion of the cover assembly removably coupled with a blade assembly.

FIGS. 4 and 5 illustrate the guide features referenced in the blade insertion and removal protocols above. Each pin 42 is provided with a lower flange 60 and an upper flange 62 which are spaced to match the thickness of a rear portion 67 of fixed blade 30. The user inserts blade assembly 12 so that it passes between each of these sets of flanges 60, 62. In the fully inserted position, a distal pair 64 and proximal pair 66 of corner-shaped shoulders formed in rear portion 67 of fixed blade 30 are provided so that multiple external faces of fixed blade 30 are stabilized by each pair of flanges 60, 62 (see FIG. 6). Two snap guides 68 are provided on the inner surface of cover 38. Snap guides 68 have a top and side surfaces which serve to guide blade assembly 12 when it is coupling with cover 38. Snap guides 68 are also provided with a flexible cantilever member 70 and are preferably molded intrinsically into the plastic cover 38. A pair of indentations 72 are provided on the lateral surfaces of rear portion 67. As fixed blade 30 is inserted, its lateral surfaces deflect flexible elements 70 of snap guide 68 until they snap into place, providing a holding force in cooperation with flange guides 60, 62 such that blade assembly 12 will be detachably retained to cover 38 and is prevented from falling out even when cover 38 is open and tool 10 is positioned tip down. Blade assembly 12 can be inserted into the retained position and removed from the retained position without the use of tools.

Upper flanges 62 may preferably have a greater thickness 73 as is shown in the alternative upper flange 74 in FIG. 5, such that the user will not be able to insert fixed blade rear portion 67 in an angled orientation such that it passes between one set of flanges 60, 62 but completely above another set of flanges 60, 62. While it is preferable that rear portion 67 is tapered so as to facilitate insertion of blade assembly 12 between various guide members, it is also desirable for it to have greater width so that it remains oriented along axis 31 when it is being inserted.

Moving blade 28 is not always in the same position relative to fixed blade 30. Furthermore eccentrically-positioned element 24 can take on a variety of positions along longitudinal axis 31 depending on the position of drive gear 20. As such, it is necessary to provide a mechanism to ensure that these elements will properly interface with each other when various blade assemblies 12 are interchanged as described above. Proper interfacing of element 24 with oblong slot 26 is ensured by mounting drive gear 20 so that it can move axially within gear housing 22 in direction 61, i.e., orthogonal to the surface of blade assembly 12. Gear pin 75 of drive gear 20 is passes through gear housing 22 and is secured via C-clip 76. Compression spring 78 is mounted around gear pin 75 so that it biases drive gear 20 into its driving position.

Figure 7:
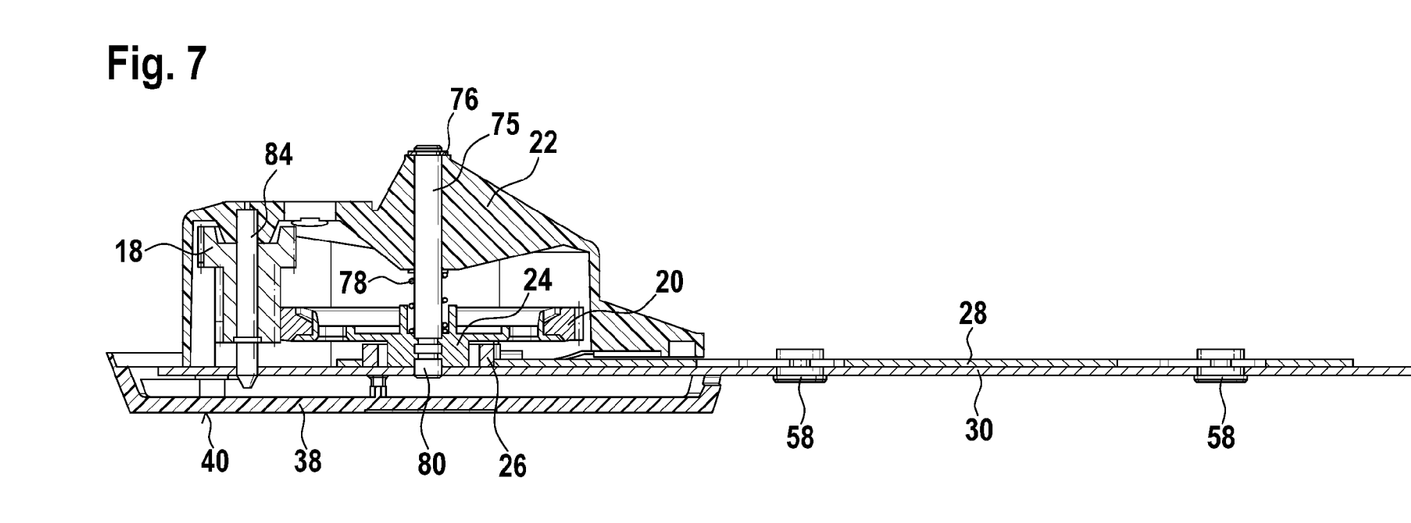
FIG. 7 is a cross-sectional view of the cover and gear assemblies wherein the cover assembly is in its closed configuration and the eccentrically positioned element is in alignment with an inserted blade assembly.
Figure 8:
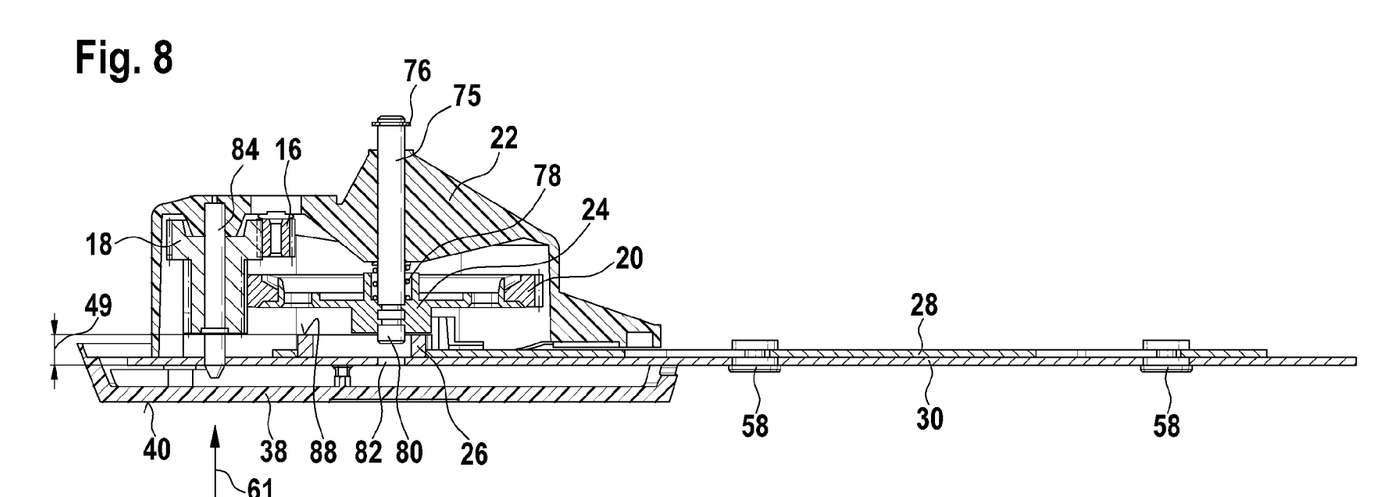
FIG. 8 is a cross-sectional view of the cover and gear assemblies wherein the cover assembly is in its closed configuration and the eccentrically positioned element is not in alignment with an inserted blade assembly.

If oblong slot 26 agrees with the position of element 24 when the cover 38 is closed, the parts will mate as in FIG. 7. A portion 80 of gear pin 75 which passes through element 24 passes through first hole 82 in fixed blade 30. A rear locking pin 84 passes through a second hold 86 in fixed blade 30. These two pins 75 and 84 ensure that fixed blade 30 remains fixed as moving blade 28 moves. If the position of oblong slot 26 does not agree with element 24, an edge 88 of oblong slot 26 will deflect element 24 and therefore drive gear 20 so that it moves axially in direction 61 as shown in FIG. 8. Once the tool is operated for the first time, element 24 will revolve and because of the spring bias it will take on the position shown in FIG. 7 at some point during the first revolution of drive gear 20.

The invention claimed is:

1. A power tool comprising:
   a tool housing;
   a blade assembly including a first blade and a second blade movable with respect to one another;
   a drive assembly arranged within the tool housing and configured to drive the blade assembly; and
   a cover coupled to the power tool such that the cover is movable relative to the tool housing between at least a first position and a second position, the cover including at least one retention element;
   wherein the blade assembly is fixedly retained by the power tool when the cover is in the first position and is detachable from the power tool when the cover is in the second position,
   wherein the cover has a tool-less mechanism configured to couple the blade assembly to the cover when the cover is in the second position, the tool-less mechanism including at least one pin fixedly positioned with respect to the cover, the at least one pin irremovably received within a corresponding cavity formed in the tool housing so as to be movable with respect to the tool housing, and
   wherein movement of the cover from the second position to the first position brings the at least one retention element into direct contact with the tool housing to retain the cover in the first position.

2. The power tool according to claim 1, wherein the cover has a further tool-less mechanism configured to detachably retain the blade assembly on the cover.

3. The power tool according to claim 2, wherein the further tool-less mechanism configured to detachably retain the blade assembly on the cover includes at least one flexible member.

4. The power tool according to claim 1, wherein the second position is parallel to the first position.

5. The power tool according to claim 1, wherein a maximum displacement distance between the first position and the second position is less than or equal to 150% of a maximum thickness of the blade assembly.

6. The power tool according to claim 1, wherein the drive assembly includes a motor, at least one gear, and an eccentric element that is eccentrically positioned with respect to the at least one gear and is configured to drive movement of the blade assembly.

7. The power tool according to claim 6, wherein said eccentric element is biased toward the blade assembly so that the eccentric element is coupled with the blade assembly when the tool is energized.

8. The power tool according to claim 1, wherein the cover is biased into the second position.

9. The power tool according to claim 1, wherein at least one force provided in a direction perpendicular to a direction of movement from the first position to the second position is necessary to decouple the cover from the tool housing.

10. The power tool according to claim 1, further comprising:
    a mechanism configured to non-removably couple the cover to the power tool, the mechanism including the at least one pin and the corresponding cavity,
    wherein the at least one pin extends from the cover perpendicularly to a bottom surface of the cover, and
    wherein the at least one pin is configured to pass through the corresponding cavity.

11. The power tool according to claim 10, wherein the mechanism includes at least one spring positioned on the at least one pin and configured to bias the cover into the second position.

12. The power tool according to claim 1, further comprising:
    a mechanism configured to couple the cover to the power tool, the mechanism including elements that comprise the tool-less mechanism configured to couple the blade assembly to the cover.

13. The power tool according to claim 1, wherein the drive assembly includes a gear housing, the gear housing arranged inside the tool housing, and the cover is coupled to the tool housing via the gear housing.

14. The power tool according to claim 13, wherein:
    the corresponding cavity is formed in the gear housing.

15. The power tool according to claim 13, further comprising:
    at least one biasing mechanism arranged between the cover and the gear housing and configured to bias the cover into the second position.

16. The power tool according to claim 1, wherein:
    the drive assembly includes a gear housing arranged inside the tool housing,
    the cover is coupled to the tool housing via the gear housing when the cover is in the first position and the second position, and
    the cover is further coupled to the tool housing via the mechanism when the cover is in the first position.

17. A power tool comprising:
    a tool housing;
    a blade assembly including a first blade and a second blade, the first blade movable with respect to the second blade;
    a drive assembly arranged within the tool housing and configured to drive the blade assembly; and
    a cover coupled to the power tool such that the cover is movable relative to the tool housing between at least a first position and a second position, the cover including at least one retention element;
    wherein the blade assembly is fixedly retained by the power tool when the cover is in the first position and is detachable from the power tool when the cover is in the second position,
    wherein the cover has a tool-less mechanism configured to couple the blade assembly to the cover when the cover is in the second position, the tool-less mechanism including at least one pin fixedly positioned with respect to the cover, the at least one pin irremovably received within a corresponding cavity formed in the tool housing so as to be movable with respect to the tool housing, and
    wherein movement of the cover from the second position to the first position brings the at least one retention element into direct contact with the tool housing to retain the cover in the first position.

* * * * *